United States Patent [19]

Frymire

[11] 4,183,576

[45] Jan. 15, 1980

[54] VEHICLE SUN ROOF HAVING ADJUSTABLE SEAL PRESSURE

[75] Inventor: Garold D. Frymire, Buena Park, Calif.

[73] Assignee: Elixer Industries, Gardena, Calif.

[21] Appl. No.: 828,822

[22] Filed: Aug. 29, 1977

[51] Int. Cl.² ............................................. B60H 1/26
[52] U.S. Cl. .................................................. 296/137 B
[58] Field of Search ............ 296/137 B, 137 C, 137 D, 296/137 E, 137 F, 137 G, 137 R; 292/DIG. 49, 263

[56] References Cited

U.S. PATENT DOCUMENTS

| | | | |
|---|---|---|---|
| 771,654 | 10/1904 | Meek | 16/174 |
| 3,610,681 | 10/1971 | Trecher | 296/137 R |
| 3,764,179 | 10/1973 | Burton | 296/137 R |
| 3,913,971 | 10/1975 | Green | 296/137 B |
| 3,972,558 | 8/1976 | Horn | 296/137 B |
| 3,974,753 | 8/1976 | Blomgren et al. | 296/137 E X |
| 3,979,148 | 9/1976 | Martin | 296/137 B |
| 4,053,177 | 10/1977 | Stammreich et al. | 292/DIG. 49 X |

FOREIGN PATENT DOCUMENTS

1441545 7/1976 United Kingdom.

*Primary Examiner*—Joseph F. Peters, Jr.
*Assistant Examiner*—Norman L. Stack, Jr.

[57] ABSTRACT

A sun roof for installation in an automobile or other vehicle including a frame surrounding a roof opening, a pivotably mounted panel for covering the opening and a seal compressed between the frame and the panel. Latches used to secure the panel in a closed or open position are attached between the panel and the frame by connection pieces, and the positions of these pieces can be adjusted by rotation to vary the downward seal compressing force. Before the connection pieces can be adjusted, it is necessary to release them from the latches which normally prevent inadvertent or unintended changes of position.

14 Claims, 6 Drawing Figures

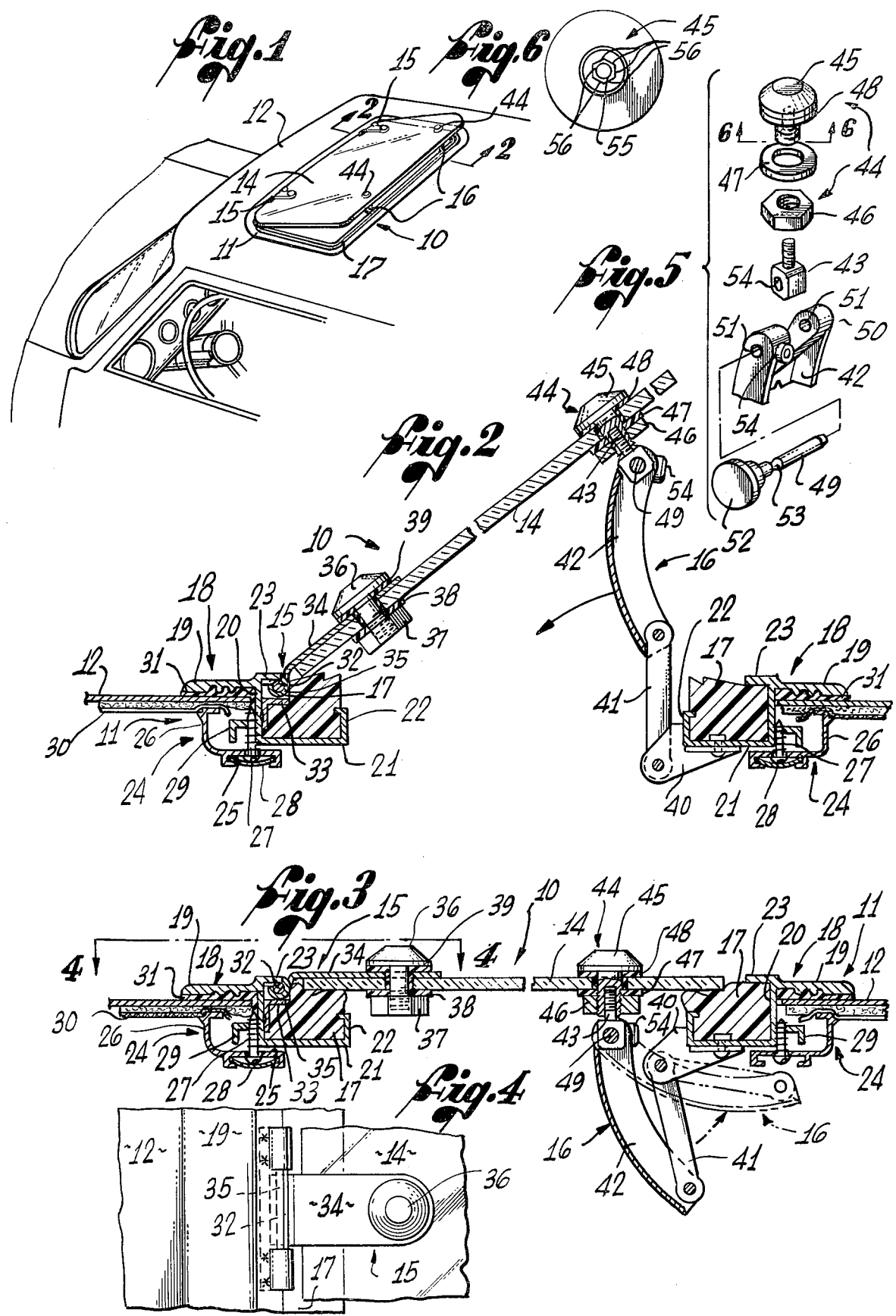

VEHICLE SUN ROOF HAVING ADJUSTABLE SEAL PRESSURE

BACKGROUND OF THE INVENTION

The present invention relates to closures and, more particularly, to sun roofs for installation in vehicles.

Automobiles and other vehicles are often equipped with roof panels that are either slidable or pivotable to expose an opening in the roof by which air and light are admitted. Slidable panels that expose the entire opening are usually opaque, whereas pivotable panels are often, but not always, made of tinted or partially mirrored glass. These devices are know collectively as sun roofs.

Pivotable sun roofs are particularly suitable for installation in existing vehicles. Typically, a rectangular hole is cut in the vehicle roof and a frame is positioned so that the edges of the roof are clamped between inner and outer frame members. The panel is hinged to the frame along its leading edge and a latch or crank type operator is attached along the trailing edge to secure the panel in a closed position, in which it engages the frame, or an open position, in which its trailing edge is raised above the frame. Often the hinges are of a disconnectable type, so that the panel can be more easily removed from the vehicle. A seal, which may be carried by the panel or the frame, prevents water leakage around the perimeter of the closed panel.

A satisfactory sun roof must be simple, inexpensive, easy to install and, of course, leak proof. It should also have a pleasing appearance, and in this regard it is important that the height of the entire sun roof be minimized. Many sun roofs in common use today project considerably above the normal roof line of the vehicle, the excessive height of the frame being required to accommodate an adequate and reliable seal. For this reason, pivotable sun roofs that are commonly installed in vans and recreational vehicles are less frequently installed in conventional automobiles where their protruding appearance is less acceptable.

Among the primary objectives of the present invention are to provide a substantially leak proof sun roof that is of simple, relatively inexpensive construction and has a pleasing appearance with a low profile.

SUMMARY OF THE INVENTION

The sun roof of the present invention, which accomplishes the foregoing objectives, utilizes a frame surrounding a vehicle roof opening, a closure panel hinged to the frame and covering the opening, a seal disposed between the frame and the panel, an adjustably positioned connection piece, and a latch releasably attached to the connection piece and connecting the panel to the frame. The downward pressure of the panel against the seal can be varied to obtain optimum sealing conditions by adjusting the position of the connection piece.

In a preferred arrangement, the connection piece is threadedly received by an anchor mounted on the panel and can be adjusted by rotation. Undesired rotation of the connection piece is prevented by the latch unless it is first released by operating a detent mechanism. This construction is particularly suitable for use with a latch having two pivotably connected members that can be folded to secure the panel in a closed position or extended to support the panel in an open position.

Each anchor member may include a head disposed on the external surface of the panel and a body extending through the panel and having a thread opening that receives the connection piece. Gripping surfaces on the body allow the anchor member to be held from inside the vehicle while a nut is tightened to secure it. The head can be completely rounded so that it cannot be gripped by a wrench to remove the panel, thereby protecting against unauthorized access to the vehicle interior through the sun roof. Anchors of the above type can be mounted directly on a tempered glass panel the perimeter of which engages a seal attached along the inner periphery of the frame.

Since the latches can be disconnected, the panel is readily removable if conventional disengageable hinges are used. It is preferable that the hinges be mounted on the frame extending over the seal and along the upper surface of the panel so they do not interfere with the interface between the panel and the seal.

Other aspects and advantages of the present invention will be apparent from the following detailed description, taken in conjunction with the accompanying drawings.

BRIEF DESCRIPTION OF THE DRAWINGS

FIG. 1 is a perspective view of a sun roof, embodying many novel features of the current invention, installed in the roof of an automobile;

FIG. 2 is an enlarged, partially broken away, sectional view of the sun roof in an open position, taken substantially along the line 2—2 of FIG. 1;

FIG. 3 is an enlarged, partially broken away, sectional view of the sun roof in a closed position also taken substantially along the line 2—2, the latch being shown in solid lines in its unlatched position and in phantom lines in its latched position;

FIG. 4 is an enlarged fragmentary view taken in the direction of the arrow 4—4 and showing a sun roof hinge;

FIG. 5 is an enlarged exploded view showing an anchor and connection piece of the sun roof; and FIG. 6 is a further enlarged end view of a bolt that forms part of the anchor.

DESCRIPTION OF THE PREFERRED EMBODIMENT

An exemplary sun roof 10 embodying many novel features of the current invention is shown in FIGS. 1-6 of the accompanying drawings. In general, it includes a frame 11 surrounding an opening in the roof 12 of an automobile 13, a glass panel 14 and shaped and dimensioned to cover the opening and connected to the frame by hinges 15, and a pair of latches 16 by which the trailing edge of the panel can be raised from a closed to an open position. When closed, the panel 14 is held tightly against a seal 17 mounted on the frame to prevent leakage.

The frame 11 includes an extruded aluminum outer member 18 (FIGS. 2 and 3) that is generally rectangular, with rounded corners, its longest dimension extending across the vehicle 13. The outer member 18 has a horizontal upper flange 19 engaging the exterior surface of the vehicle roof 12, a vertical wall 20 extending downwardly from the inner edge of the upper flange and a lower horizontal flange 21 projecting inwardly (toward the center of the sun roof) from the bottom of the wall. An upstanding lower lip 22 carried by the inner edge of the lower flange 21 completes an upwardly facing U-shaped channel extending about the periphery of the frame 11, and an upper lip 23 projects horizontally from the top of the wall 20 over a portion of the channel.

On the inside of the vehicle 13, an inner frame member 24 opposes and mates with the outer member 18, which is of approximately the same size. The inner member 24 includes a horizontal portion 25 that extends beneath the under side of the lower flange 21 and merges with an upwardly projecting vertical portion 26 that abuts the vehicle roof 12, opposing the upper flange 19. Fastening screws 27, hidden from the interior of the vehicle 13 by a trim strip 28, extend upwardly through the inner member 24 into a down-turned rim 29 formed on the outer surface of the wall 20 near its lower edge, thus clamping the vehicle roof 12, including its headliner 30, firmly between the top of the inner member and the under side of the upper flange 19. A gasket 31 is inserted between the upper flange 19 and the roof 12 to prevent leakage.

The seal 17, which is an elongated strip of compressible foam rubber, is seated in the channel of the upper frame member 18, held by the upper and lower lips 23 and 22, and directly engaged by the beveled outer edge of the panel 14, which is an integrally formed sheet of tempered glass. It should be noted that the frame 11 and panel 14 are both slightly bowed longitudinally to conform to the curvature of the vehicle roof 12. Although roof configurations vary, there is sufficient flexibility in the frame 11 and panel 14 to allow these components to conform to the roof shapes of many different vehicles.

The leading edge of the panel 14 is pivotably attached to the frame 11 by the two hinges 15, as best shown in FIGS. 2, 3 and 4. Each hinge 15 includes a horizontal pin 32 secured along the inwardly facing surface of the wall 20 just below the upper lip 23, and a ledge 33 extending parallel to the pin and just beneath it. The mating hinge component is an elongated plate 34 bent at one end to form an upwardly facing hook 35 that can be inserted above the ledge 33 to engage the pin 32. It extends across the seal 17 and over the top surface of the panel 14 so that it does not interfere with the effectiveness of the interface between the seal 17 and the panel. The hinge plate 34 is secured to the panel 14 by an anchor bolt 36 that projects through an aperture in the panel and a nut 37 that engages its inner end. Inner and outer washers 38 and 39 separate the panel and hinge plate surfaces from the nut 37 and anchor 36.

Once the panel 14 is pivoted into a nearly vertical position so that the hooks 35 open toward the wall 20, the hinge plates 34 can be disengaged from the pins 32 by moving the panel toward the rear of the vehicle 13. In this way, the hinge 15 can be disconnected to remove the panel 14.

The trailing edge of the frame 11 carries the latches 16 of a well known type that secure the panel 14 in an open or closed position. Each latch 16 includes a bracket 40 riveted to the under side of the lower flange portion 21 of the outer frame member 18. An elongated inner latch piece 41 is pivotally connected to the bracket 40 and an outer latch piece 42 is pivotally connected to the opposite end of the inner piece, the outer piece also being pivotally connected to the trailing panel edge by a connection piece 43 and an anchor 44 (FIG. 5).

When the panel 14 is held closed, the latch pieces 41 and 42 are folded into a co-extensive position with the inner piece received within a cavity forwardly the outer piece, as shown in phantom lines in FIG. 3. Both latch pieces 41 and 42 are slightly arcuate so that they extend around the bottom corner of the frame 11 when in this folded position. To hold the panel 14 in an open position, as shown in FIGS. 1 and 2, the latch pieces 41 and 42 are unfolded and moved into a vertically extended position in which they support the trailing edge of the panel above the roof 12 of the vehicle 13.

It will be noted that when the panel 14 is in its closed position, it must be urged pivotally against the seal 17 by a sufficient downward force, directed toward the interior of the vehicle 13, to prevent leakage. On the other hand, if too much seal pressure results, it may be difficult to operate the latches 16 and damage to the sun roof 10 may result. Even if close manufacturing tolerances are observed, it can be difficult to insure that the seal pressure is neither too high nor too low, particularly in view of the differences in the curvature of various vehicle roofs to which the sun roof 10 must be adaptable. Optimum seal pressure is, however, made possible by the adjustability of the connection pieces 43 that extend toward the vehicle interior and connect the latches 16 to the glass panel 14. Variation in the connection piece positions can affect the seal pressure exerted along the entire periphery of the panel 14, since the hinges 15 are pivotable on an axis located in the outboard side of the seal 17.

Each connection piece 43 forms a stud which is externally threaded. It is received by an internally threaded, axial opening in the cylindrical body of an anchor bolt 45 that projects downwardly through the panel 14. The bolt has a rounded head on the outside of the panel 14 and an exteriorly threaded body engaged by an anchor nut 46 on the inside of the panel, the nut and bolt together forming the anchor 44. Washers 47 and 48 protect the panel from direct contact with the nut 46 and bolt 45.

The connection piece 43 is releasably attached to the latch 16 by a removable release pin 49 extending through two sides of a bifurcated end 50 of the outer latch piece 42, as best shown in FIG. 5. At its center, the pin 49 is rotatably journalled in two aligned apertures 51 at the lower end of the connection piece 43, thus pivotally attaching the lower end of the connection piece to the latch 16. Although the position of these connection pieces 43 is readily adjustable, inadvertent and gradual unintended changes in their position is prevented by their connection to the latches 16.

One end of the release pin 49 carries an enlarged, disk-shaped knob 52 by which it can be grasped for removal when the connection piece position is to be adjusted. A circumferential groove 53 near the knob 52 is engaged by a resilient ball detent 54 carried by the outer latch piece 42 to hold the pin 49 when inserted. It should be noted that the releasability of the latches 16, in addition to facilitating adjustment of the connection piece positions, renders the panel 14 removable upon disconnection of the hinges 15.

To prevent unauthorized access to the interior of the vehicle 13 through the sun roof 10, the only exposed portion of the anchors 44 on the outside of the panel 14 is the rounded heads of the anchor bolts 45 which have no gripping surfaces by which they can be engaged by a wrench to be turned and loosened. So that it can be secured to the panel 14, however, each bolt 45 has a countersunk surface 55 centered on its lower end, the axial opening forming an aperture therein facing the interior of the vehicle 13, as shown in FIG. 6. The countersunk surface 55 is surrounded by six flat, inwardly facing, gripping surfaces 56 so that it can be engaged from inside the vehicle 13 by a conventional hexagonal Allen wrench and held against rotation while the anchor nut 46 is tightened. A similar bolt and nut arrangement is used to form the anchors 36 that mount the hinge plates 34 to the panel 14.

It will be noted from the foregoing that the closure of the present invention provides a sun roof having a downward seal compressing force of adjustable magnitude to prevent leakage, despite a simple, inexpensive and low profile seal and frame structure. While a preferred embodiment of the invention has been shown and described, it will be apparent that various modifications can be made without departing from the spirit and scope of the invention.

I claim:

1. A sun roof for installation in a vehicle roof comprising:
   an outer frame member for engaging the outer surface of said vehicle roof and surrounding an opening therein, said outer frame member defining a channel;
   an inner frame member of approximately the same size as said outer frame member positioned in opposition to said outer frame member to engage the inner surface of said vehicle roof;
   means for securing said inner frame member to said outer frame member, thereby clamping said vehicle roof between said inner and outer frame members;
   at least one panel shaped and dimensioned to cover said opening when in a closed position so that said channel faces said panel;
   a compressible seal disposed in said channel between said outer frame member and said panel;
   hinge means for pivotably connecting said panel to said frame and extending from said outer frame member over said panel;
   a connection piece extending downwardly from said panel toward the interior of said vehicle;
   latch means for securing said panel in a closed position and in at least one open position, said latch means including release means for releasably connecting said latch means between said connection piece and said outer frame member; and
   anchor means mounted on said panel for adjustably positioning said connection piece to vary the downward compressive force exerted on said seal by said panel when said panel is in said closed position.

2. A sun roof for installation in a vehicle roof comprising:
   an outer frame member for engaging the outer surface of said vehicle roof and surrounding an opening therein;
   an inner frame member of approximately the same size as said outer frame member positioned in opposition to said outer frame member to engage the inner surface of said vehicle roof;
   means for securing said inner frame member to said outer frame member, thereby clamping said vehicle roof between said inner and outer frame members;
   at least one panel shaped and dimensioned to cover said opening when in a closed position;
   a compressible seal disposed between said outer frame member and said panel;
   hinge means for pivotably connecting said panel to said frame;
   a connection piece extending downwardly from said panel toward the interior of said vehicle;
   latch means for securing said panel in a closed position and in at least one open position, said latch means including release means for releasably connecting said latch means between said connection piece and said outer frame member; and
   anchor means mounted on said panel for adjustably positioning said connection piece to vary the downward compressive force exerted on said seal by said panel when said panel is in said closed position, said connection piece being threadedly received by said anchor means, whereby the position of said connection piece can be adjusted by rotation thereof, said latch means preventing rotation of said connection piece when said latch means is connected between said connection piece and said outer frame member.

3. A sun roof for installation in a vehicle roof comprising:
   an outer frame member for engaging the outer surface of said vehicle roof and surrounding an opening therein;
   an inner frame member of approximately the same size as said outer frame member positioned in opposition to said outer frame member to engage the inner surface of said vehicle roof;
   means for securing said inner frame member to said outer frame member, thereby clamping said vehicle roof between said inner and outer frame members;
   at least one panel shaped and dimensioned to cover said opening when in a closed position;
   a compressible seal disposed between said outer frame member and said panel;
   hinge means for pivotably connecting said panel to said frame, said hinge means extending from one of said frame members over said seal to said panel;
   a connection piece extending downwardly from said panel toward the interior of said vehicle;
   latch means for securing said panel in a closed position and in at least one position, said latch means including release means for releasably connecting said latch means between said connection piece and said outer frame member; and
   anchor means mounted on said panel for adjustably positioning said connection piece to vary the downward compressive force exerted on said seal by said panel when said panel is in said closed position.

4. The sun roof of claim 3, wherein said panel is made of a single integrally formed sheet of tempered glass.

5. The sun roof of claim 3, wherein said hinge means comprises a first hinge member mounted on said outer frame member and a second hinge member mounted on said panel, said first and second hinge members being disengageably from each other so that said panel can be removed from said frame.

6. The sun roof of claim 3, wherein said release means directly connects said latch means to said connection piece.

7. The sun roof of claim 6, wherein:
   said connection piece is an externally threaded stud having an aperture therein in which said release means is receivable; and
   said release means prevents rotation of said connection piece when received in said aperture.

8. A sun roof for installation in a vehicle roof comprising:

an outer frame member for engaging the outer surface of said vehicle roof and surrounding an opening therein;

an inner frame member of approximately the same size as said outer frame member positioned in opposition to said outer frame member to engage the inner surface of said vehicle roof;

means for securing said inner frame member to said outer frame member, thereby clamping said vehicle roof between said inner and outer frame members;

at least one panel shaped and dimensioned to cover said opening when in a closed position;

a compressible seal disposed between said outer frame member and said panel;

hinge means for pivotably connecting said panel to said frame;

a connection piece extending downwardly from said panel toward the interior of said vehicle;

latch means for securing said panel in a closed position and in at least one open position, said latch means including release means for releasably connecting said latch means between said connection piece and said outer frame member; and anchor means mounted on said panel for adjustably positioning said connection piece to vary the downward compressive force exerted on said seal by said panel when said panel is in said closed position, said anchor means comprising:

(i) a round head free of gripping surfaces and overlying the exterior surface of said panel;

(ii) a body extending from said head through said panel, said body having a threaded opening therein facing the interior of said vehicle in which said connection piece is received, an external threaded surface, and a plurality of flat gripping surfaces for engagement by a wrench, said gripping surfaces being located on the opposite side of said panel from said head; and (iii) a nut engaging said external threaded surface.

9. The sun roof of claim 8, wherein said body has a countersunk surface surrounded by said gripping surfaces, said threaded opening forming an aperture in said countersunk surface.

10. A sun roof or similar closure for installation in a vehicle comprising:

a frame defining a channel extending along its inner periphery and surrounding an opening in said vehicle;

at least one panel disposed within said frame to cover said opening when in a closed position;

hinge means for pivotably connecting said panel to said frame;

a seal disposed within said channel between said panel and said frame and compressed between said panel and said frame when said panel is in said closed position, said hinge means extending from said frame across said seal and to said panel;

a connection piece extending from said panel toward the interior of said vehicle;

anchor means mounted on said panel for engaging and positioning said connection piece and for adjusting the position of said connection piece toward and away from said panel upon rotation of said connection piece; and latch means mounted on said frame for releasably engaging said connection piece and for exerting on said panel a seal compressing force directed toward the interior of said vehicle, said latch means preventing rotation and adjustment of said connection piece when said connection piece is engaged by said latch means.

11. The closure of claim 10, wherein said latch means includes at least two latch members having a folded position for securing said panel in said closed position while exerting said seal compressing force, and an extended position for supporting said in an open position.

12. The closure of claim 10, wherein said hinge means includes a first hinge member mounted on said frame and a second hinge member mounted on said panel, said first and second hinge members being disengageable so that said panel can be removed from said frame.

13. The closure of claim 10, wherein said anchor means comprises:

a head free of gripping surfaces and overlying the exterior surface of said panel;

a body extending from said head through said panel, said body having a threaded opening facing the interior of said vehicle in which said connection piece is received, an external threaded surface, and a plurality of gripping surfaces accessible only from the interior of said vehicle for engagement by a wrench; and a nut engaging said external threaded surface.

14. The window of claim 13, wherein said body has a countersunk surface surrounded by said gripping surfaces, said threaded opening forming an aperture in said countersunk surface.

* * * * *

UNITED STATES PATENT AND TRADEMARK OFFICE
CERTIFICATE OF CORRECTION

PATENT NO. : 4,183,576
DATED : January 15, 1980
INVENTOR(S) : Frymire, Garold D.

It is certified that error appears in the above-identified patent and that said Letters Patent are hereby corrected as shown below:

Col. 6, line 40, before "position" insert --open--

Col. 8, line 28, after "said" insert --panel--.

Signed and Sealed this

Third Day of June 1980

[SEAL]

Attest:

SIDNEY A. DIAMOND

Attesting Officer

Commissioner of Patents and Trademarks